3,217,642
COMPOSITIONS FOR PRINTING PLATES HAVING IMPROVED SHRINKAGE

Norman G. Tompkins, deceased, late of Melrose, Mass., by Audrey S. Tompkins, Melrose, Mass., and Boston Safe Deposit and Trust Company, Boston, Mass., executors, and John F. Broderick, Natick, Mass., assignors to W. R. Grace & Co., Cambridge, Mass., a corporation of Connecticut
No Drawing. Filed Sept. 5, 1963, Ser. No. 306,958
5 Claims. (Cl. 101—401.1)

This invention relates to printing plate compositions. In one particular aspect, it relates to flexible letterpress printing plates derived from thermosetting compositions containing a shrink control agent. In another aspect, it relates to the use of such compositions as backing elements for printing plates such as electrotypes.

In making flexible molded duplicate printing plates from thermosetting compositions, such as vulcanizable rubber compounds or curable polyvinyl chloride compositions, there is characteristically some shrinkage of the plate from the dimensions of the mold. The dimensional change results from the fact that a material having a low thermal expansion coefficient, such as cellulose or asbestos fibers, is incorporated in the mold and the printing plate takes the shape of the mold at an elevated temperature but shrinks on cooling to a much greater extent than the size of the mold. In a rubber plate, typical shrinkage amounts to about 1.75 percent and in a plate obtained from a curable polyvinyl chloride composition it is about 2¼ percent due to the higher plate-molding temperature.

Several methods have been proposed to cope with the problem of plate shrinkage. In one method, the practice is to make the original type form somewhat larger, and hence the mold, to compensate for the shrinkage which will occur to produce a plate of the desired size. This is quite impractical where the type forms are already in existence and it is costly to duplicate the forms in an enlarged size. Another method involves the incorporation of a material having a low thermal expansion coefficient in the plate. By embedding a wire screen, perforated sheet metal, paper, cloth or glass fabric in the printing plate composition before molding, the dimension changes that occur during molding can be substantially reduced. Such materials, however, cannot be placed too close to the printing surface because they are apt to project beyond the plate surface and produce impaired printing impressions. When they are embedded a safe distance from the printing surface, a "dished" effect in solids and halftone areas results and consequently the impressions are not faithfully reproduced.

The present invention provides a means for controlling shrinkage of flexible duplicate letterpress printing plates derived from thermosetting components. It comprises uniformly dispersing a sufficient quantity of a finely divided blowing agent in the plate-making composition and thereafter subjecting the composition to a heat-pressing operation to form the plates. During the molding cycle, the small gas bubbles which result from the decomposition of the blowing agent cause expansion of the resulting plate when the mold is opened. Subsequent cooling shrinks the plate to conform to the dimensions of the mold. Surprisingly, the resulting plate does not have a cellular structure but appears continuous throughout. By varying the amount of blowing agent, shrinkage may be controlled from a positive value, such as 1.75 to 2.25 percent which is normally experienced, through zero to a negative value, the latter of which indicates enlargement from the mold dimensions.

In addition to forming flexible plates, the composition containing the blowing agent is useful in reinforcing the back of electrotype shells. These shells are usually reinforced with lead which is not only expensive but also makes the plates quite heavy. Reinforcement is generally accomplished by first tinning the back surface, using tinfoil and flux, pouring molten lead on the tinned surface, and then cooling in a casting machine. The plate is "bumped" to bring all printing portions into one plane and "shaved" to fix the thickness of the plate accurately. It is then proofed and any low areas are raised by hammering at the appropriate points on the rear of the plate. Trimming and bevelling follow as well as bending if the electrotype is to be used on a rotary press, followed by final proofing. In addition to all of these operations, an electrotype frequently requires many hours of make-ready time on the press where the plates are moved slightly to bring them into register and handcut underlays are placed under low areas so that all matter will print in the correct position and with the required definition and blackness. By using the composition of this invention to reinforce electrotype plates, many of the operations associated with lead reinforcement are eliminated. For example, bending the plate to fit the curvature of rotary presses is simpler because the solidified composition is flexible in nature. In addition, the electrotype may be finished to a uniform thickness simply by grinding the reinforcing composition.

In preparing flexible plates from compositions of this invention, a type form is first made by any typesetting process and complete with halftone etchings so mounted that their printing surfaces are level with the type faces. The lettering and illustrations on the form are raised in relief and in mirror reversal of the original. A matrix or mold is then made of the type form by depressing the relieved surface into a thermosetting material, such as a phenolic impregnated paperboard, at high temperature wherein a cavity is formed bearing the relieved images incised therein in positive form. The resulting matrix is then laid flat with the cavity side upward, and the surface of the cavity is sprayed with a release agent to facilitate separation of the plate from the matrix. A non-volatile fluid, such as one containing a silicone oil, has been found effective for this purpose.

A liquid resinous composition, from which the printing plate is made, is then poured onto the sprayed surface of the matrix cavity in amount sufficient to fill the cavity, and preferably a slight excess. The compositions flow readily and penetrate the impressions in the matrix with ease to assure faithful reproduction of the type form.

The materials for forming the plates are thermosettable compositions comprised of a vinyl resin, such as polyvinyl chloride, and an imidazoline. Such materials readily penetrate all impressions in the matrix, and because of their infusible nature the resulting plates may be separated from the matrix while hot without causing distortion.

Imidazolines are strong organic bases, highly reactive with many reagents, and many possess strong surface activity. In these compositions, their principal function is to crosslink the polymeric chains. They are non-volatile and chemically stable at curing temperatures, and the uncured mixture containing the imidazoline and the vinyl resin undergoes no change with time.

The imidazolines may be prepared by contacting appropriate amounts of polyamines and mono- and/or polycarboxylic acids at reactive temperatures and pressures for about 3 to 4 hours. The temperature may range between about 150° C. and 240° C. and the operable pressure may range between about .1 mm. and 760 mm. Hg. Suitable polyamines are ethylene and propylene diamine, diethylene and dipropylene triamine, triethylene tetramine, and tetraethylene pentamine. Suitable monocarboxylic acids are those containing from 1 to 18 carbon atoms, such as acetic, caproic, pelargonic, lauric, palmitic, oleic, and stearic acids; suitable polycarboxylic acids include those having from 3 to 36 carbon atoms, such as adipic, pimelic, suberic, azelaic, sebacic, dimerized and mixtures of dimerized and trimerized fatty acids. In addition, mixtures of mono- and/or polycarboxylic acids may be used. It is, of course, within the scope of this invention to use polyimidazolines, i.e., compounds having more than one imidazoline ring. These may be prepared by reacting mono- and polycarboxylic acids or mixtures thereof with a polyamine having more than two amino groups, such as triethylene tetramine, or mixtures of polyamines.

The following Table I illustrates reactants and reaction conditions which may be employed to prepare a representative number of imidazolines and polyimidazolines for use as curing agents in the printing plate compositions. Various combinations of acid and amine may be employed and this table should be considered as representative and not exhaustive of the many possible combinations.

will cause perforations in the surface of the printing plate nor so well gelled as to prevent proper expansion of gas.

There are numerous blowing agents which are suitable for controlling shrinkage of the plates. Among those which can be used are azodicarbonamide, 3,3'-disulphonhydrazido diphenylsulfone, dinitrosopentamethylene tetramine, diazoaminobenzene, p,p'-oxybis (benzene sulfonyl hydrazide), sodium carbonate, ammonium carbonate, and ammonium bicarbonate. The nitrogen-evolving compounds are particularly suitable. The quantity of blowing agent may vary from between about 1.5 to 8.0 percent based on the weight of the resin. When amounts less than 1.5 percent are used, expansion is inadequate to control shrinkage and when amounts in excess of 8.0 percent are used, expansion is too great. In the latter case, excessive expansion produces dimensional changes in the plates which adversely affect the quality of the reproductions. Good shrink control is achieved when 2.5 to 4.5 percent of blowing agent based on the weight of the resin is used.

In making the printing plate composition, the vinyl chloride polymer is thoroughly dispersed in the pre-re-

TABLE I

| Product | Acid | Moles | Amine | Moles | Reaction Conditions | | |
|---|---|---|---|---|---|---|---|
| | | | | | Pressure, mm. Hg | Temp., °C. | Hours |
| A | Sebacic<br>Oleic | 1<br>1 | Triethylene tetramine | 2 | 760–15 | 150–220 | 4 |
| B | Sebacic<br>Oleic | 5<br>2 | ----do---- | 6 | 760–15 | 150–200 | 4 |
| C | Sebacic<br>Oleic | 1<br>2 | ----do---- | 2 | 760–15 | 150–220 | 4 |
| D | Acetic | 1 | ----do---- | 1 | 760–15 | 150–200 | 4 |
| E | Pelargonic | 1 | Diethylene triamine | 1 | 760–50 | 150–200 | 4 |
| F | Empol 1022* | 1 | ----do---- | 2 | 760–50 | 150–200 | 4 |
| G | Oleic<br>Sebacic<br>Empol 1024* | 4<br>3<br>1 | Triethylene tetramine | 8 | 760–20 | 150–220 | 4 |

*Mixtures of polymerized acids comprising about 75 percent dimeric and 25 percent trimeric acids derived from a mixture of unsaturated 18-carbon monocarboxylic fatty acids.

The imidazoline is first pre-reacted with a non-resinous epoxy compound before it is mixed with the vinyl chloride polymer to provide the resulting printing plate with the desirable degree of flexibility. When the composition is cured during the molding step, the epoxy compound is chemically grafted to the vinyl chloride polymer through the imidazoline, thus rendering it inextractable by inks and solvents. Suitable non-resinous epoxy compounds include epoxidized triglycerides of vegetable oil fatty acids, such as epoxidized soybean oil and epoxidized castor oil, and epoxidized esters of lower alkyl alcohols and unsaturated fatty acids. Representative compounds of the latter group include methyl-, ethyl-, propyl-, and butyl-9,10 - epoxystearate; butyl - 9,10,12,13 - diepoxystearate, butyl - 9,10 - epoxypalmitate; and butyl - 12 - hydroxy-9,10-epoxystearate. Reaction of the imidazoline and the epoxy compounds proceeds quite readily when carried out at temperatures between about 100° C. and 190° C., and preferably between about 130° C. and 150° C. The constitution of the imidazoline-epoxy compound reaction product varies and is dependent upon the particular reactants used consistent with the degree of flexibility and hardness which is desired in the printing plate.

The blowing agents are preferably employed in a finely divided state having a particle size ranging between about 1 to 10 microns to assure intimate and thorough dispersion in the composition. They are so selected that their decomposition temperatures are slightly below the final curing temperature of the vinyl resin composition. A difference between maximum curing temperature and decomposition of the blowing agent of about 15° to 30° C. is satisfactory. By selectively choosing the blowing agent, expansion is produced when the composition is in a fairly tough gel state, i.e., when it is not so fluid that blowing acted imidazoline-epoxy compound fluid product containing the blowing agent and other ingredients. The mixture is stable at room temperature and the pre-reacted fluid reacts with the polymer only after heating. Thus, no polymerization or crosslinking takes place until the composition is heated in the press at about 120° C. to 200° C. for about 1 to 12 minutes and preferably at about 150° C. to 165° C. for 5 to 10 minutes. Upon heating to the softening point of the dispersed polymer, a reaction sets in which leads to chemical crosslinking of the polymer and chemical attachment of both imidazoline and epoxy molecules thereto. Printing plates made from these compositions are flexible which permits their use interchangeably on rotary or flat bed presses without distorting the printed image.

Preparation of a specific imidazoline-epoxy compound reaction fluid is illustrated in Example I:

*Example I*

67.7 pounds (.24 mole) of oleic acid and 36 pounds (.06 mole) of "Empol 1024" were mixed together in a glass vacuum vessel and then 36.4 pounds (.18 mole) of sebacic acid were added. The acids were heated to about 70° C. and then 70.2 pounds (.48 mole) of triethylamine tetramine were added. 0.21 pound of powdered sodium tripolyphosphate was then added to inactivate and chelate any metal impurities which may have been present in the acids and amine. The reactants were vigorously agitated and a nitrogen atmosphere was applied and maintained throughout the reaction period. The mixture was heated initially at one atmosphere to about 150° C. and the temperature was gradually raised until a value of about 220° C. was reached over a three-hour period while the pressure was correspondingly reduced from 760 to 20 mm.

Hg. The reaction was then continued for one hour at 220° C. and 20 mm. Hg. Water of condensation was removed throughout the reaction period as formed. The amount of water removed corresponded with about 85 percent conversion of the carboxyls to imidazoline groups, leaving a balance of the carboxyl in the form of amides as confirmed by infrared absorption analysis. The product was then cooled to 130° C. and is identified as product G of Table I. Three hundred pounds of epoxidized soybean oil were heated to 130° C. in an open vessel and then 100 pounds of the foregoing imidazoline product (already at a temperature of 130° C.) were added slowly with stirring. When all of the imidazoline was added, the mixture was reacted at 130° C. for about one hour with gentle stirring and then cooled. The reaction proceeded smoothly and gave a product which was permanently fluid at room temperature. Care was taken to protect the reaction mixture and the cooled product from moist air and/or carbon dioxide, each of which tends to produce bubbles in the final printing plate.

While the imidazoline is a highly effective curing agent for vinyl chloride polymers, its curing action must be controlled to avoid degradation of the polymer when the composition is heated in the press. To regulate the curing action of the imidazoline, a metallic compound, such as zinc oxide, is added to the composition. The zinc oxide retards blackening on heating, prevents gas evolution and augments resistance to moisture while retaining the advantage of imidazoline cure. The grade of zinc oxide is not a critical factor so long as good dispersion is obtained. A particle size of about .5 micron is quite effective.

An agent is also added to sequester any moisture which may remain in the composition after it is manufactured or which may reach the composition accidentally during storage and/or use. The presence of moisture is undesirable because it forms bubbles in the molded plate which adversely affect its printing surface. Any material which would form a compound with water at room temperature and which, when compounded with the water, would not decompose at about 175° C. would be a suitable moisture-sequestering agent provided it could be reduced to a finely divided state so as to obtain good dispersion and would not cause any undesirable side effects. Quicklime, Portland cement, and barium oxide are satisfactory for this purpose. White Portland cement is preferred because it disperses readily to provide a more homogeneous plate.

The vinyl chloride polymer, imidazoline-epoxy compound reaction product, zinc oxide, blowing agent and the moisture-sequestering agent form a composition which is quite viscous and a satisfactory plate can be made using only these ingredients. However, its viscous nature makes handling and workability of the composition difficult. To alleviate these difficulties, a viscosity-lowering agent is included in the composition. Suitable agents include polyethylene glycol stearate, condensation products of ethylene oxide and propylene glycol, sorbitan monopalmitate, sorbitan monooleate, 3,5-dimethyl-1-hexyn-3-ol, and the fatty acid esters of polyethylene glycol, 200–600 series (the numerals represent the approximate molecular weight of the polymeric glycol minus the weight of the fatty acid moiety). Polyethylene glycol 400 monooleate is quite effective for this purpose.

The composition may be prepared by charging the requisite amounts of all ingredients in a single pass to a suitable mixing apparatus, or by adding the ingredients incrementally. Whatever method is selected, mixing is carried out until all ingredients are thoroughly and uniformly dispersed to form a homogeneous liquid. A preferred method is to carry out the mixing operation in a stepwise manner by forming masterbatches of certain ingredients and then gradually combining the major portions of the formulation with the masterbatches to assure intimate dispersion of all ingredients. A typical sequence comprises forming a first masterbatch consisting of the imidazoline-epoxy compound reaction product and the blowing agent, separately forming a second masterbatch consisting of zinc oxide, the moisture-sequestering agent, and a portion of the imidazoline-epoxy compound reaction product, and then combining the two masterbatches with the remaining ingredients of the formulation.

Representative masterbatches are illustrated in Examples II and III:

Example II 200 g. of azodicarbonamide were charged to a pebble mill with 1600 g. of the imidazoline-epoxy compound reaction product of Example I and ground for 100 hours. The resulting dispersion was removed and set aside as masterbatch I.

Example III 50 lbs. of the imidazoline-epoxy compound reaction product of Example I, 50 lbs. of white Portland cement, and 15 lbs. of zinc oxide were stirred to a smooth paste and passed through a Manton Gaulin homogenizer to assure complete dispersion. The resulting dispersion constituted masterbatch II.

A complete formulation of the composition from which the printing plate is prepared is described in Example IV.

Example IV

| Ingredient: | Grams |
|---|---|
| Masterbatch I (Example II) | 160.0 |
| Masterbatch II (Example III) | 12.8 |
| Polyethylene glycol 400 monooleate | 11.1 |
| Polyvinyl chloride, paste grade | 239.0 |
| Imidazoline-epoxy compound reaction product of Example I | 10.0 |

In preparing the composition of Example IV, the entire amount of the imidazoline-epoxy compound reaction product is charged to a vacuum mixer and then each of the master batches is added with agitation. The components are mixed for a prescribed period, agitation is stopped, a portion of the polyvinyl chloride is then added, and the mixer is closed and a vacuum applied. Agitation is resumed and continued until the polyvinyl chloride is thoroughly incorporated in the liquid. Agitation is again halted, the vacuum is released, and the step of adding the polyvinyl chloride incrementally is continued until the entire amount required by the formulation has been charged and thoroughly blended. Agitation under vacuum is then resumed and continued until all specks and lumps have been completely dispersed. Finally, the polyethylene glycol 400 monooleate was stirred in under vacuum. The resulting composition was a heavy cream-like liquid.

Plates are molded from compositions of this invention in a standard platemaking press which is generally used in preparing matrices and rubber and plastic plates. The equipment is essentially comprised of a hydraulic press which is capable of producing platen pressures of about 1000 pounds per square inch and in which the platens can be heated uniformly with steam or electricity to a temperature of at least about 145° C. In the molding operation, the pressure of the platens on the assembled matrix is regulated by bearers disposed on opposed sides of the matrix. These bearers consist simply of strips of metal, the thickness of which corresponds to the thickness of the assembled matrix. When the press is closed, the pressure of the platens is exerted principally on the bearers and the amount of pressure which is applied to the assembled matrix is governed by the corresponding thickness of the bearers. Accordingly, deformation of the matrix is avoided by the use of such bearers.

Preparation of a flexible letterpress printing plate from the composition of Example IV is illustrated in Example V.

Example V

A rigid matrix, prepared from a thermoset material, was provided bearing a cavity in which the reproducible matter consisting of lettering and halftone illustrations was impressed. The matrix was laid flat with the cavity side upward and the surface of the cavity was sprayed with a layer of a non-volatile release fluid containing a silicone oil to assist subsequent separation of the plate from the matrix. A frame, referred to as a restrictor chase, was then placed on the peripheral edge of the matrix to contain the liquid composition in the cavity. The chase was provided with a plurality of spaced milled gates through which excess composition can escape during the molding operation.

When the chase had been properly placed, a portion of the liquid composition of Example IV was poured in amount sufficient to fill the cavity of the matrix. The entire assembly was then heated in an open press at a temperature of about 162° C. for approximately three to five minutes. The preheating period raises the temperature and lowers the viscosity of the liquid to a point where it flows readily in the mold and thus reaches the most difficulty accessible recesses therein and allows any bubbles of air, which may have been trapped during pouring, to escape. Following the preheating period, the entire assembly was covered with a Teflon-coated aluminum plate. The press was then slowly closed in order to allow any air bubbles accidentally included therein to escape, and the pressure was raised to about 500 pounds per square inch over the chase area. The temperature was maintained at a steady level of 162° C. during the molding cycle. The assembly was kept in the press for nine and one-half minutes and then removed and disassembled. The resulting plate was immediately stripped from the matrix while hot without any damage to the plate or its printing surface. When cooled, the plate exhibited a shrinkage of −0.63%, that is, it was slightly larger than the mold and had a hardness of 95, Shore A durometer.

The plate of this invention was proofed and compared with a proof derived from a plate prepared without a blowing agent. The comparisoin showed that the plate of this invention gave acceptable printing quality.

While the plate of this example was stripped in a hot state from the matrix, in some cases it may be desirable to allow the plate to cool for a short period in the press as the pressure developed by the gas-evolving blowing agent may cause over-expansion of the plate.

*Example VI*

In this example, a composition was prepared which produced a printing plate having substantially a zero shrink value.

40 g. of the imidazoline-epoxy compound reaction product of Example I, 1.2 g. of Portland cement, 0.5 g. of zinc oxide and 2.5 g. of azodicarbonamide were milled together for 8 hours. Thereafter, 60 g. of polyvinyl chloride were blended into the mixture, a vacuum of 25 mm. was drawn, and the entire composition was stirred for 6 hours.

A printing plate was made from this composition according to the molding procedure described in Example V. The result was a plate having no measurable shrink when compared to the original type form. Proofs of the plate gave reproductions similar to those derived from the type form.

In using the compositions of this invention as a reinforcing or backing for electrotype plates, the same procedure is followed as in the plate-making operation. Reinforcement is carried out by bending the edges of the plate backward to form a tray or shell. The shell is filled with the composition and the assembly is passed to a heated press and retained in the press for a time sufficent to cure the composition. It is then removed from the press and processed to place the plate in printable condition, such as trimming, bevelling and grinding. It may be bent easily to fit the curvature of rolls for rotary printing.

The proportions of the liquid thermosettable compositions may be varied depending upon the desired hardness of the final plate. For plates having a hardness of 30 to 95, Shore A durometer, the compositions comprise 0.5 to 3.0, preferably 0.7 to 2.0, parts by weight of the imidazoline-epoxy compound reaction product; .01 to .05, preferably .02 to .03 part by weight of the moisture-sequestering agent; between about .005 and .010 part by weight, preferably .007 to .009, of zinc oxide; and 0 to .10, preferably .06 to .08, part by weight of the viscosity-lowering agent. All proportions are based on one part by weight of polyvinyl chloride. Copolymers of vinyl chloride may be substituted for polyvinyl chloride, such as vinyl chloride copolymerized with up to 10 percent of another polymerizable monomer, e.g., 91 to 97 percent vinyl chloride and 9 to 3 percent vinyl acetate, 93 to 95 percent vinyl chloride and 7 to 5 percent dibutyl maleate.

We claim:

1. A liquid thermosetting printing plate composition which comprises one part by weight of a vinyl chloride polymer, about .005 to .010 part by weight of zinc oxide, about 0.5 to 3.0 parts by weight of the reaction product of a non-resinous epoxy compound and an imidazoline, and between about 1.5 and 8.0 percent based on the weight of the vinyl chloride polymer of a blowing agent, said oxide, reaction product and blowing agent being based on the weight of the vinyl chloride polymer.

2. A liquid thermosetting printing plate composition which comprises (a) a vinyl chloride polymer, (b) about .005 to .010 part by weight of zinc oxide, (c) about 0.5 to 3.0 parts by weight of the reaction product of an imidazoline and a non-resinous epoxy compound, (d) about .01 to .05 part by weight of a moisture-sequestering agent, (e) about 0 to .10 part by weight of a viscosity-lowering agent, and (f) about 1.5 to 8.0 percent by weight of a blowing agent, the proportions of components (b), (c), (d), (e) and (f) being based on one part by weight of the vinyl chloride polymer.

3. A liquid thermosetting printing plate composition which comprises 60 parts by weight of polyvinyl chloride, 40 parts by weight of the reaction product of an imidazoline and a non-resinous epoxy compound, 1.2 parts by weight of Portland cement, 0.5 parts by weight of zinc oxide, and 2.5 parts by weight of azodicarbonamide.

4. A process for making thermoset printing plates which comprises providing a matrix having a cavity bearing reproducible matter, filling the cavity with a liquid composition consisting of one part by weight of vinyl chloride polymer, about .005 to .010 part by weight of zinc oxide, about 0.5 to 3.0 parts by weight of the reaction product of a non-resinous epoxy compound and an imidazoline, and between about 1.5 and 8.0 percent by weight of a blowing agent, said oxide, reaction product and blowing agent being based on the weight of the vinyl chloride polymer, preheating the assembled matrix in an open press at a temperature of about 162° C. for approximately 3 to 5 minutes, closing the press, thereafter maintaining the temperature constant at about 162° C. for about 9 and one-half minutes and separating the resulting plate from said matrix.

5. A process according to claim 4 wherein the composition additionally contains about .01 to .05 part by weight of a moisture-sequestering agent and about 0 to .10 part by weight of a viscosity-lowering agent, said agents being based on the weight of the vinyl chloride polymer.

References Cited by the Examiner
UNITED STATES PATENTS

| | | | |
|---|---|---|---|
| 2,114,288 | 4/1938 | Davis. | |
| 2,476,832 | 7/1949 | Donia | 260—45.5 X |
| 2,875,051 | 2/1959 | De Maria. | |
| 3,050,528 | 8/1962 | Dearborn et al. | 260—309.6 |
| 3,055,297 | 9/1962 | Leeds | 101—401.1 |

DAVID KLEIN, *Primary Examiner.*

WILLIAM B. PENN, *Examiner.*